Nov. 19, 1963     B. O. AYERS     3,111,025
CHROMATOGRAPHIC SEPARATION PROCESS
Filed Sept. 26, 1960
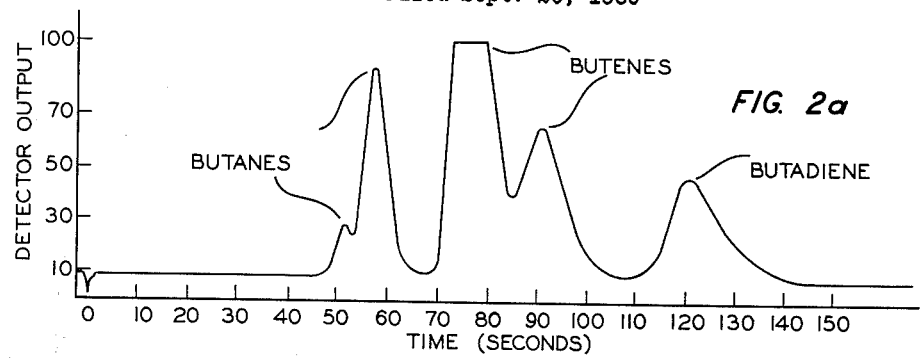
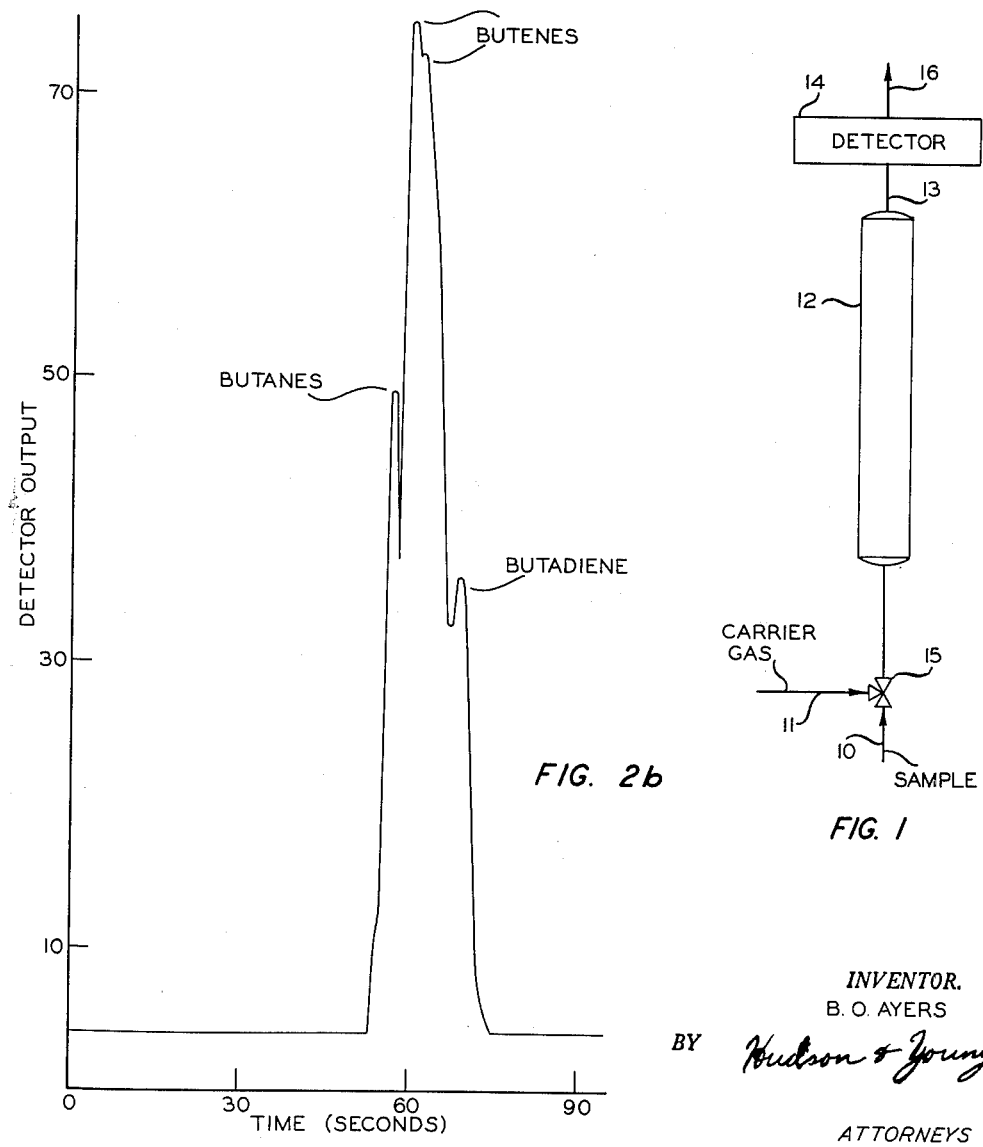
INVENTOR.
B. O. AYERS
BY Hudson & Young
ATTORNEYS __United States Patent Office__ 3,111,025
Patented Nov. 19, 1963

3,111,025
CHROMATOGRAPHIC SEPARATION PROCESS
Buell O. Ayers, Bartlesville, Okla., assignor to Phillips Petroleum Company, a corporation of Delaware
Filed Sept. 26, 1960, Ser. No. 58,481
10 Claims. (Cl. 73—23)

This invention relates to an improved method of analyzing fluid streams.

A method of measuring the concentration of constituents of a fluid stream involves the use of a chromatographic analyzer. In chromatography, a vapor sample of the material to be analyzed is introduced into a column containing a selective sorbent or partitioning material. A carrier gas is directed into the column so as to force the sample material therethrough. The selective sorbent, or partitioning material, attempts to hold the constituents of the mixture. This results in the several constituents of the fluid mixture flowing through the column at different rates of speed, depending upon their affinities for the packing material. The column effluent thus consists initially of the carrier gas alone, the individual constituents of the fluid mixture appearing later at spaced time intervals. A conventional method of detecting the presence and concentration of these constituents is to employ a thermal conductivity detector which compares the thermal conductivity of the effluent gas with the thermal conductivity of the carrier gas directed to the column.

Chromatographic analyzers of the type described have proven to be quite useful. However, with certain control applications involving the solution of light molecular weight hydrocarbons in high boiling organic solvents, it is necessary to operate chromatographic analyzers at a temperature above the boiling point of the organic solvent in order to prevent condensation in the analyzer. This makes the separation and analysis of light hydrocarbons, and particularly of light olefins, very difficult. Liquid partition columns are normally unstable at high temperatures and those liquid partition columns which are stable at high temperatures lose separating efficiency so that excessively long columns are required to obtain the required separation. The analysis time thus becomes too long for effective automatic control. The use of absorbent columns such as alumina, charcoal and silica gel leads to excessive tailing of the chromatographic peaks and resultant difficulty in making quantitative measurements.

I have discovered that the partial blocking of a chromatographic column active adsorbent with a liquid of low volatility leads to less tailing of the chromatographic peaks while at the same time providing a chromatographic column which retains a high resolving power at high temperatures.

Accordingly, an object of this invention is to provide an improved method and apparatus for the analysis of fluid streams.

Another object of this invention is to provide an improved method and apparatus for the analysis of light molecular weight hydrocarbons in the presence of high boiling organic solvents.

Other objects, advantages, and features of my invention will be readily apparent to those skilled in the art from the following description and the appended claims.

FIGURE 1 is a schematic representation of the analyzing equipment employed in the inventive process.

FIGURE 2a is a graphical representation of an operating feature of the analyzer of FIGURE 1.

FIGURE 2b is a graphical representation of a conventional chromatographic analysis.

Referring to FIGURE 1, there is shown a column 12 which is filled with an activated adsorbent packing material that selectively retards the passage therethrough of the constituents of the fluid mixture to be analyzed. Some examples of suitable activated adsorbent packing materials, necessarily dependent upon the fluid mixture to be analyzed, are alumina, charcoal and silica gel. The activated adsorbent packing material selected supports a stationary liquid boiling above 125° C. and tending to separate the sample constituents in the same order as the adsorbent packing material when said stationary liquid is supported on an inert material such as Chromosorb fire brick material manufactured by Johns-Mansville for use in chromatographic analyzers. The recommended concentration of stationary liquid based upon the weight of the absorbent packing material is in the range of 1 to 10 percent.

The activated adsorbent packing material supporting the high boiling stationary liquid can be prepared by dissolving the stationary liquid in a volatile solvent such as acetone. The solution is added to the activated adsorbent. The resulting slurry is dried under a heat lamp and reactivated under vacuum for 1–2 hours at a temperature slightly above the boiling point of the volatile solvent.

In the chromatographic separation of butenes from butadiene, for example, alumina is chosen as the activated adsorbent packing material inasmuch as alumina does not promote polymerization of the butadiene. A suitable stationary liquid having a high boiling point and tending to separate the butenes from butadiene in the same order as the alumina adsorbent packing material is selected from the group consisting of bis-2-(methoxyethyl)phthalate, bis-2-(methoxyethyl)adipate, polyethylene glycol and polyethylene glycol succinate.

A fluid sample to be analyzed is introduced into the inlet of column 12 by means of a conduit 10 and a three-way control valve 15. Carrier gas is introduced into column 12 by means of a conduit 11 and three-way valve 15. The effluent from column 12 passes by means of a conduit 13 to the inlet of a detector 14.

Detector 14 is adapted to measure a property of fluid mixture directed thereto, which property is representative of the composition of the fluid mixture. The detector can advantageously comprise a thermal conductivity analyzer which includes a temperature sensitive resistance element disposed in the sample gas flow. A reference element, not shown, can be disposed in the carrier gas flow. Such a detector provides signals representative of the difference in thermal conductivity between the column effluent and the carrier gas. The temperature differences between the resistance elements can be measured by electrical bridge circuits, such as a Wheatstone bridge. However, the detector can also be any other type of apparatus known in the art for measuring a property of a gaseous stream.

Three-way valve 15 can be operated by a timer, not herein shown. Such a timer provides output signals that operate a valve in a desired sequence. This timer can be any type of apparatus known in the art for providing control signals in a desired sequence. One common type of timer which can be employed to advantage utilizes a series of cam operated switches wherein the associated cams are rotated by a timing motor.

Advantages and features of the inventive process are readily apparent when reference is made to the following specific analyses of hydrocarbon mixtures.

Column 12 was formed of 4 feet of ¼-inch stainless steel tubing containing activated alumina as a packing material. The activated alumina supported bis-2-(methoxyethyl)phthalate as a stationary liquid, the concentration of said stationary liquid being 2 percent based upon the weight of the activated alumina. Helium was employed as a carrier gas and was supplied by conduit 11 at the rate of 200 cc./min. The volume of the sample mixture analyzed was 0.5 cc. and was of the following composition:

| | Percent |
|---|---|
| Isobutane | 3 |
| Normal butane | 14 |
| Isobutylene | 7 |
| Butene-1 | 17 |
| Butene-2, low boiling | 22 |
| Butene-2, high boiling | 19 |
| Butadiene-1,3 | 18 |

The sample was passed to column 12 at a temperature of 125° C.

The results are as noted in FIGURE 2a wherein it is noted that the butene peaks have effectively separated from the peak representing the concentration of butadiene with the separate concentrations of the butenes and butadiene readily ascertainable.

In order to demonstrate the effectiveness of the inventive process, a comparison run was made wherein bis-2-(methoxyethyl)phthalate was employed as a partitioning liquid with the partitioning liquid supported on 80–100 mesh chromosorb, an inert material. For this run, column 12 was formed of 10 feet of ¼-inch stainless steel tubing containing the aforementioned partitioning liquid, with the concentration of the partitioning liquid on the inert support being 20 percent by weight. Helium was employed as a carrier gas and was supplied by conduit 11 at the rate of 200 cc./min. A sample mixture, having the same composition as the sample mixture previously analyzed, was passed to column 12 by means of conduit 10 at a temperature of 120° C. The volume of the sample mixture analyzed was 0.5 cc.

FIGURE 2b represents the output signal of detector 14. Although a longer column was used in this run, it would be impossible to accurately determine the concentration of butadiene and the butenes from FIGURE 2b. To approach the operational efficiency demonstrated by FIGURE 2a, it would be necessary to employ a chromatographic column 40–50 feet in length. This would result in a necessarily long analysis time, too long for effective automatic control.

As will be evident to those skilled in the art, various modifications of this invention can be made, or followed, in the light of the foregoing disclosure and discussion without departing from the spirit or scope thereof.

I claim:

1. A method of analyzing fluid mixtures which comprises introducing a vaporous fluid mixture into the inlet of a zone containing an activated adsorbent packing material that selectively retards passage therethrough of the constituents of said mixture, said mixture comprising in part at least one constituent boiling above 125° C., said adsorbent packing material supporting a stationary liquid boiling above the inlet temperature of said vaporous fluid mixture, said stationary liquid when supported on an inert packing material tending to separate the sample constituents in the order that said activated adsorbent packing material will separate said sample constituents, and measuring a property of the effluent from said zone which is representative of the composition thereof.

2. The method of claim 1 wherein the concentration of said stationary liquid is in the range of 1 to 10 percent based upon the weight of said adsorbent packing material.

3. A method of analyzing a fluid mixture containing light saturated hydrocarbons, monolefins, and diolefins in the presence of an organic solvent having a boiling point above 125° C, which comprises introducing said fluid mixture as a vapor into the inlet of a zone containing activated alumina as a packing material, said activated alumina supporting 1 to 10 percent by weight of a stationary liquid having a boiling point above the inlet temperature of said vaporous fluid mixture, said stationary liquid when supported on an inert packing material tending to separate the sample constituents in the order that said alumina will separate said sample constituents, introducing a carrier gas into the inlet of said zone, and measuring a property of the effluent from said zone which is representative of the composition thereof.

4. The method of claim 3 wherein said stationary liquid is selected from the group consisting of bis-2-(methoxyethyl)phthalate, bis-2-(methoxyethyl) adipate, polyethylene glycol and polyethylene glycol succinate.

5. The method of claim 3 wherein the stationary liquid employed is bis-2-(methoxyethyl)phthalate and the sample fluid mixture contains butenes and butadiene.

6. Apparatus comprising a column, said column containing an activated adsorbent packing material that selectively retards passage therethrough of the constituents of a vaporous fluid mixture, said adsorbent packing material supporting a stationary liquid boiling above the inlet temperature of said vaporous fluid mixture and tending when supported on an inert packing material to separate the constituents of said vaporous fluid mixture in the order that said activated adsorbent packing material will separate said constituents, a first conduit means communicating with said column at one end of said adsorbent packing material, and a second conduit means communicating with said column at the opposite end of said adsorbent packing material.

7. The apparatus of claim 6 wherein the concentration of said stationary liquid is in the range of 1 to 10 percent based upon the weight of said adsorbent packing material and the boiling point of said stationary liquid is above 125° C.

8. The apparatus of claim 7 wherein the adsorbent packing material is activated alumina and the stationary liquid is selected from the group consisting of bis-2-(methoxyethyl)phthalate, bis-2-(methoxyethyl)adipate, polyethylene glycol and polyethylene glycol succinate.

9. The apparatus of claim 8 wherein the stationary liquid employed is bis-2-(methoxyethyl)phthalate.

10. The method of claim 2 wherein said activated adsorbent packing material is selected from the group consisting of alumina, charcoal, and silica gel.

References Cited in the file of this patent

UNITED STATES PATENTS 3,048,029  Juvet _____ Aug. 7, 1962

OTHER REFERENCES

Instruments for Gas and Vapor Chromatography, Catalogue 84, Burrell Corporation, Pittsburgh, Pa. (pages 48, 49).

Gas Chromatography Abstracts, 1959, Butterworths Scientific Publications, London, 1960 (pages 15, 25 and 26).

An article by S. D. Nogare entitled "Review of Fundamental Developments in Analysis-Gas Chromatography," in Analytical Chemistry, vol. 32, No. 5, April, 1960 (pp. 19R–23R).